(12) United States Patent
Hall, III et al.

(10) Patent No.: US 6,206,577 B1
(45) Date of Patent: Mar. 27, 2001

(54) FIBER OPTIC ADAPTER SHUTTER DOOR ASSEMBLY

(75) Inventors: Thomas A. Hall, III, Campobello; Richard T. King, Greer; Craig S. Henderson, Woodruff, all of SC (US)

(73) Assignee: Alcoa Fujikura Limited, Brentwood, TN (US)

( * ) Notice: Subject to any disclaimer, the term of this patent is extended or adjusted under 35 U.S.C. 154(b) by 0 days.

(21) Appl. No.: 09/244,450

(22) Filed: Feb. 4, 1999

Related U.S. Application Data

(60) Provisional application No. 60/073,733, filed on Feb. 5, 1998.

(51) Int. Cl.[7] .................................................. G02B 6/36
(52) U.S. Cl. ........................... 385/53; 385/55; 385/56; 385/58; 385/60; 385/70; 385/73; 385/75; 385/77; 385/78; 385/88; 385/89; 385/93; 385/92; 439/135; 439/138
(58) Field of Search .................... 385/53, 55, 56, 385/58, 60, 70, 71, 73, 78, 77–93; 139/138, 135

(56) References Cited

U.S. PATENT DOCUMENTS

| | | | |
|---|---|---|---|
| 4,640,575 | 2/1987 | Dumas | 350/96.2 |
| 4,767,179 | 8/1988 | Sampson et al. | 350/96.2 |
| 5,030,120 | 7/1991 | Hartley | 439/144 |
| 5,073,042 | 12/1991 | Mulholland et al. | 385/69 |
| 5,243,678 | 9/1993 | Schaffer et al. | 385/134 |
| 5,329,604 | 7/1994 | Baldwin et al. | 385/92 |
| 5,372,515 | * 12/1994 | Miller et al. | 439/138 |
| 5,414,790 | 5/1995 | Lee et al. | 385/139 |
| 5,506,922 | 4/1996 | Grois et al. | 385/75 |
| 5,570,445 | * 10/1996 | Chou et al. | 385/92 |
| 5,687,268 | 11/1997 | Stephenson et al. | 385/73 |
| 5,708,745 | 1/1998 | Yamaji et al. | 385/92 |

FOREIGN PATENT DOCUMENTS

| | | | |
|---|---|---|---|
| 2300978 | 11/1996 | (GB) | G02B/6/36 |
| 63-118707 | 5/1988 | (JP) | G02B/6/42 |

* cited by examiner

*Primary Examiner*—Cassandra Spyrou
*Assistant Examiner*—Craig Curtis
(74) *Attorney, Agent, or Firm*—Tracey D. Beiriger

(57) ABSTRACT

A new and unique connector adapter shutter door assembly retrofitable to many existing connector adapters or receptacles which becomes a part of the same by connectedly fitting or snapping into place. The shutter door assembly can be used as a safety device to prevent laser light from escaping when a connector is removed from an adapter or receptacle. Because of the ease with which the shutter door assembly can be retrofitted to existing adapters, it is possible to selectively install the shutter door assembly only when a safety hazard is present. Also the shutter door assembly can be used to shield a connector end to prevent foreign matter, such as dust and dirt, from entering the connector. The shutter door assembly is a molded one-piece structure and has inwardly hinged doors permitting one hand connector insertion and withdrawal. The streamline design of the shutter door assembly takes very little space when in use making it desirable for typical space constrained applications.

20 Claims, 6 Drawing Sheets

FIBER OPTIC ADAPTER SHUTTER DOOR ASSEMBLY

CROSS REFERENCE TO RELATED APPLICATIONS

This application claims the benefit of U.S. Provisional Application Ser. No. 60/073,733, filed on Feb. 5, 1998, the disclosure of which is fully incorporated by reference herein.

BACKGROUND OF THE INVENTION

1. Field of the Invention

This invention pertains to a shutter door assembly for fiber optic connector housings and adapters, adapters being devices that connect two male connectors in optical alignment with each other. The shutter door assembly, adaptable to most existing SC connector and similar connector housings and adapters, can be used to shield laser light from escaping and impinging someone's eyes when a connector is removed from an adapter or receptacle. Also the shutter door assembly can be used when the connector is not in use to shield the end of a connector housing to minimize the collection of foreign matter, such as dust and dirt, inside the connector housing and on the end face of an optical connector that may be inserted into the adapter.

2. Technology Review

Optical fiber devices use single or multiple strands of fibers each having an inner circular glass core coated with circumferential cladding having a different index of refraction. Light is transmitted along the core and totally reflected from the interface between the core and the cladding. Such devices can be used as optical transmission lines for transmitting and/or receiving, information bearing light energy.

Typically, optical transmission lines terminate in optical fiber connectors, such as those referred to in the industry as SC connectors, each of which include as part thereof an outer housing wherein there is positioned the terminating end of the optical fiber. Such connectors are illustrated and described in U.S. Pat. Nos. 4,953,929 and 5,212,752. The term connector is meant to include SC connectors as well as duplex variety connectors as shown in U.S. Pat. No. 5,005,939.

There presently exists in the industry various connecting devices, typically referred to as adapters or receptacles. An adapter is a device used for connecting and aligning two male fiber optic connectors while a receptacle is used to hold light sources such as LEDs or lasers, or to hold receiving detectors such as photodiodes. U.S. Pat. No. 5,329,604 discloses an optical fiber connecting device with an integral pivotal lightshield. This device can not be used on an SC connector adapter, nor can it be retrofitted to other various adapters. U.S. Pat. No. 5,243,678 discloses an alignment cover for a fiber optic receptacle. This cover serves to align an active optical device within the receptacle and to also act as a dust shield to the receptacle when disconnected. This device can not be used with an adapter. Further, the cover simply plugs into the receptacle and is not an integral part of or permanently attached to the receptacle. U.S. Pat. No. 5,687,268 discloses an optical shutter for use with optical fiber connector coupling adapters. This device requires a special adapter configuration and specific adapter orientation. Also, the shutter is a multicomponent assembly. Further, the shutter requires space to be operated when in use.

SUMMARY OF THE INVENTION

As defined herein, the present invention provides a new and unique connector adapter shutter door assembly. The shutter door assembly can be retrofitted to many existing SC type connector adapters or receptacles without any or little substantial modification to such adapters or receptacles, and becomes a part of the same by connectedly fitting into place. The shutter door assembly can be used as a safety device to prevent or deter laser light from escaping when a connector is removed from an adapter or receptacle. Because of the ease with which the shutter door assembly can be retrofitted to existing adapters, it is possible to selectively install the shutter door assembly only to those adapters where a safety hazard will be present. Also the shutter door assembly can be used to shield a connector end to prevent dust and dirt from entering the connector.

The shutter door assembly is a molded one-piece structure and has inwardly hinged doors permitting one hand connector insertion and withdrawal. The streamline design of the shutter door assembly takes very little space when in use making it desirable for typical space constrained applications.

It is therefore, an object of the present invention to provide a fiber optic connector adapter light shield that prevents laser light from escaping when a male connector is removed from an adapter or receptacle that can be operated with one hand.

It is another objective to provide a fiber optic connector adapter shield that can be retrofitted to existing connector adapters or receptacles.

It is yet another objective to provide a fiber optic connector adapter shield that can be used to seal the end of a connector or a connector port to prevent foreign matter from contacting the optical fibers.

It is a further objective to provide a fiber optic connector adapter shield that can be installed only as needed where exiting laser light imposes a safety hazard.

DETAILED DESCRIPTION OF PREFERRED EMBODIMENTS

Figure 1:
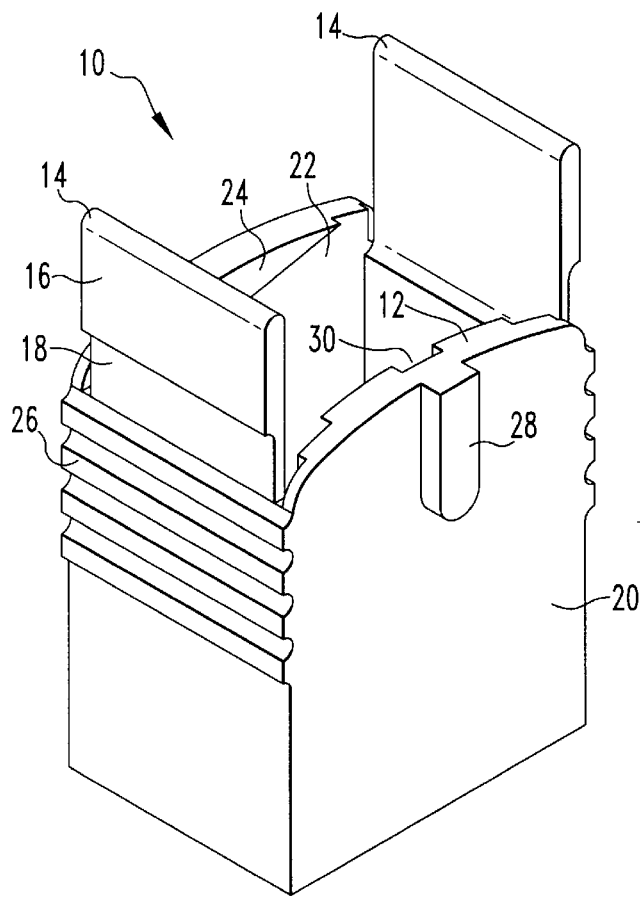
FIG. 1 is a perspective view of the shutter door assembly as molded.

Referring to FIG. 1, the shutter door assembly 10 according to the invention includes a housing 12 and shutter doors 14. As molded, shutter doors 14 extend outwardly from the housing 12. By molding the shutter door assembly 10 as one piece with doors 14 extending beyond and outwardly from housing 12, simple injection molds can be used to make the assembly.

Figure 2:
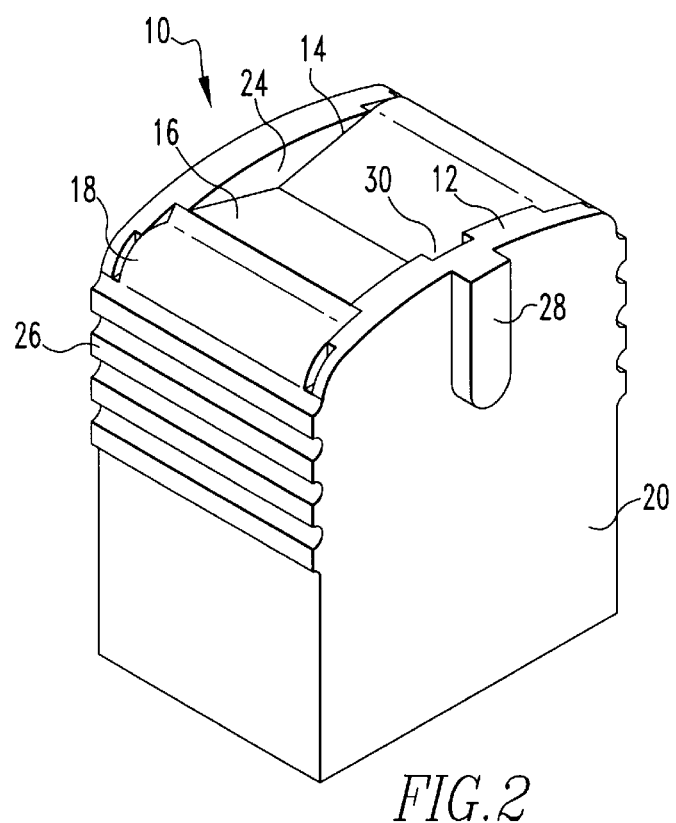
FIG. 2 is a perspective view of the shutter door assembly with the shutter in the closed position.

Prior to fitting shutter door assembly 10 onto an adapter 82, shutter doors 14 are folded over at the living hinge or leaf spring 18 and pushed inside the housing as shown in FIG. 2.

Doors 14 are prevented from popping outwardly by raised ribs 24 on the internal surface 22 of housing 12. That is, ribs 24 act as a stop and prevent shutter doors 14 from popping up or outwardly after doors 14 have initially cleared rib 24. When the doors are folded over as shown in FIG. 2, assembly 10 is considered to be in the closed position. Assembly 10 generally remains in the closed position except when mated with an adapter 82 and holding a connector 80. Upon withdrawal of connector 80, shutter doors 14 will be stopped by ribs 24 and prohibit laser light from escaping without any additional operator effort. Further, because once assembly 10 is in use, doors 14 face inwardly from the outer surface 20 of the housing, a connector can be inserted or removed without additional space needed about the shutter door assembly 10.

Figure 3:
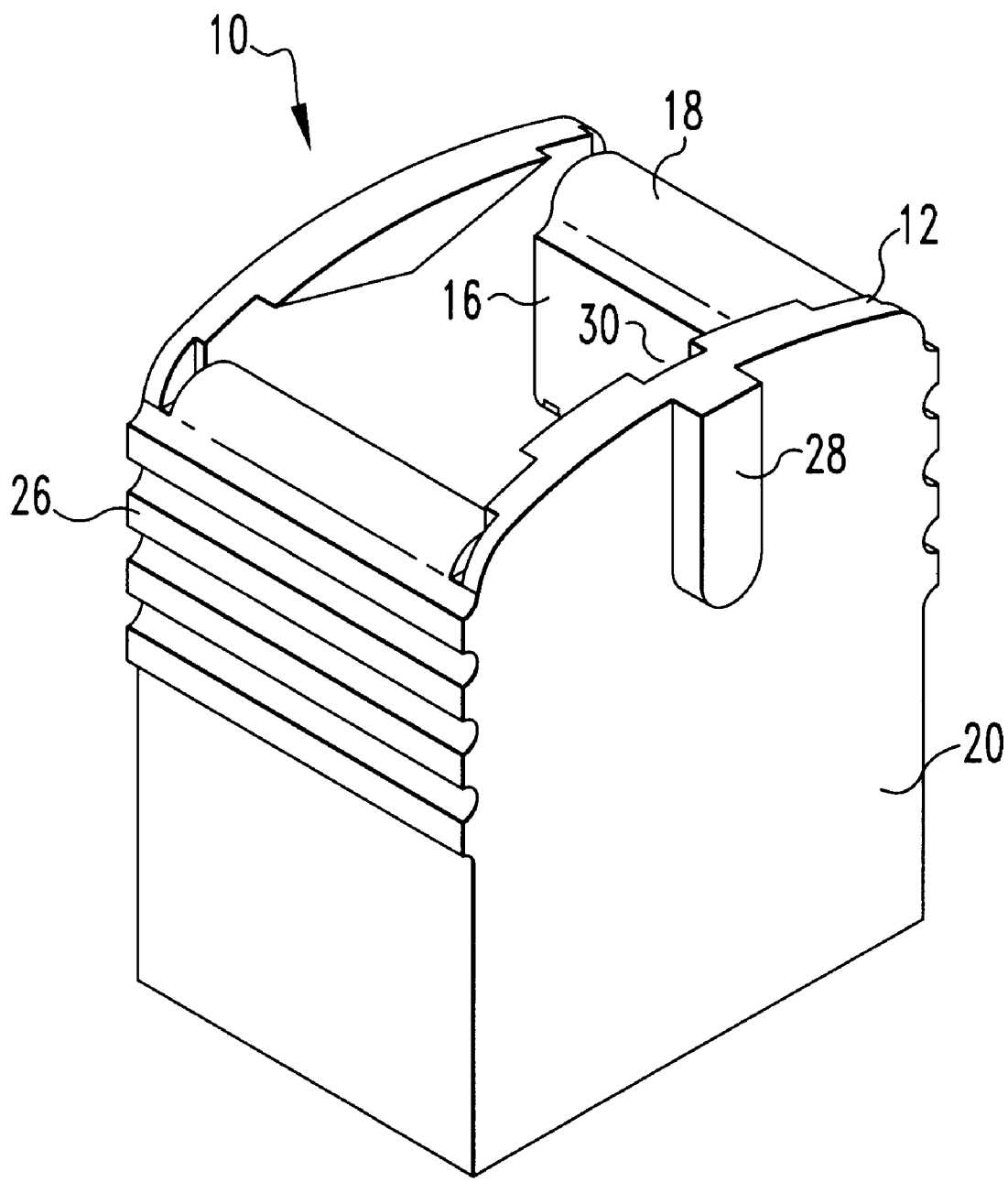
FIG. 3 is a perspective view of the shutter door assembly with the shutter in the open position.
Figure 5A:
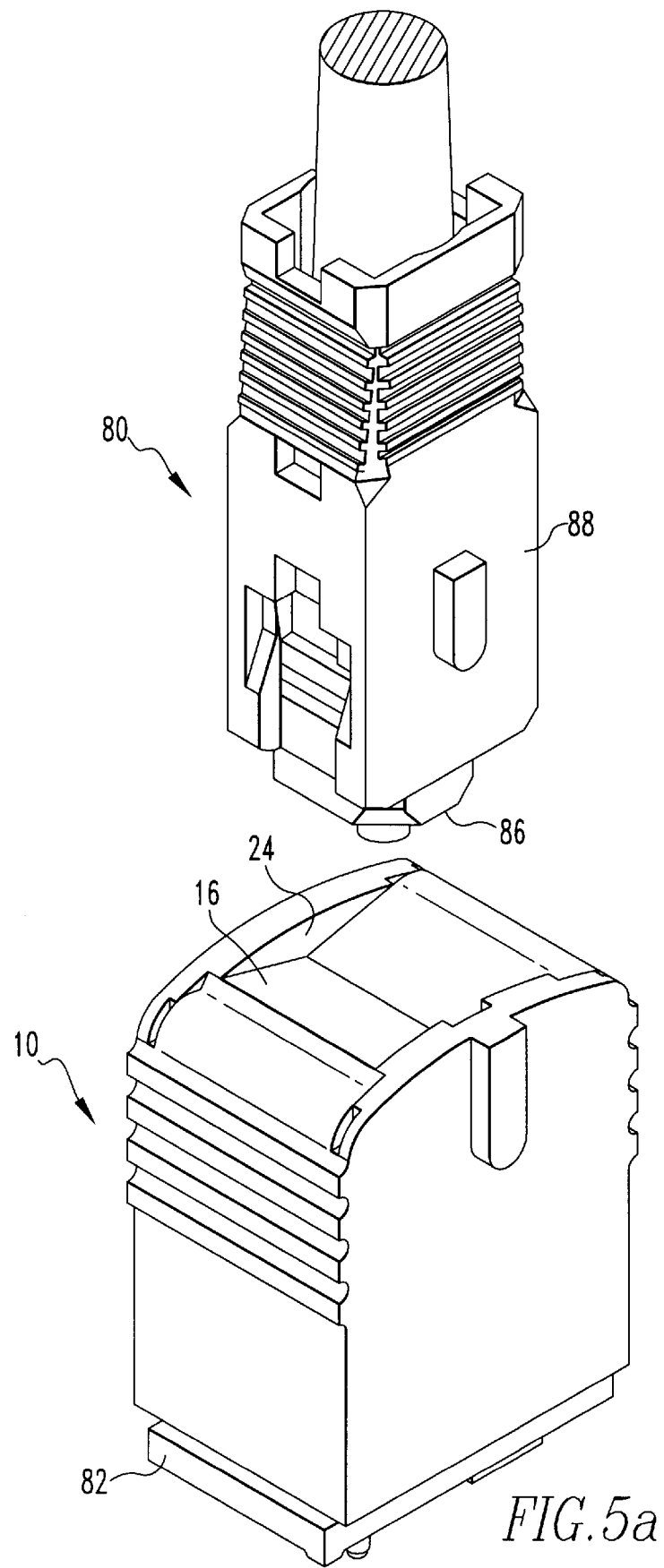
FIG. 5a is a perspective view of the adapter and shutter door assembly receiving a connector.
Figure 5B:
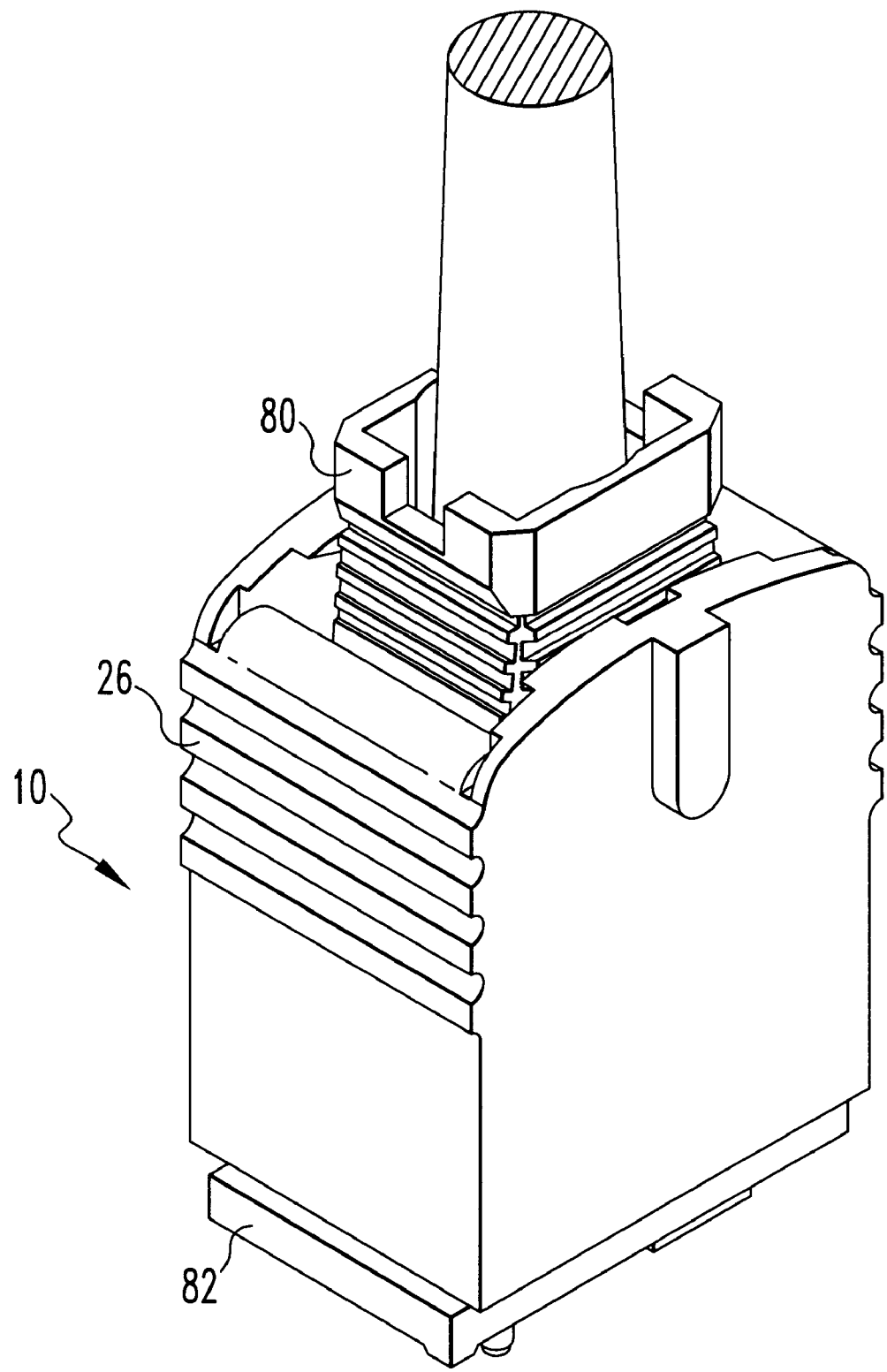
FIG. 5b is a perspective view of the adapter and shutter door assembly after receiving a connector.

As stated above, FIG. 2 shows doors 14 in the closed position. When in a closed position, shutter doors 14 are symmetrical and overlap to provide a hazardous path for laser light. This overlap prevents direct alignment of the fiber, specifically the emitted laser light, and of any space that may occur between the doors if their edges just met rather than overlap. Further, shutter doors 14 are angled inwardly to prevent accidental contamination of the optical face of a fiber (not shown) under normal use. As shown in FIG. 5a, the angle of doors 14 helps to prevent doors 14 from contacting the optical face of fiber during and after insertion of a connector 80. That is, the front body face 86 of connector 80 contacts the outer surfaces 16 of doors 14 and pushes doors 14 inwardly (FIG. 3) when connector 80 is inserted into adapter 82 which is mated with assembly 10, as described below.

Figure 4A:
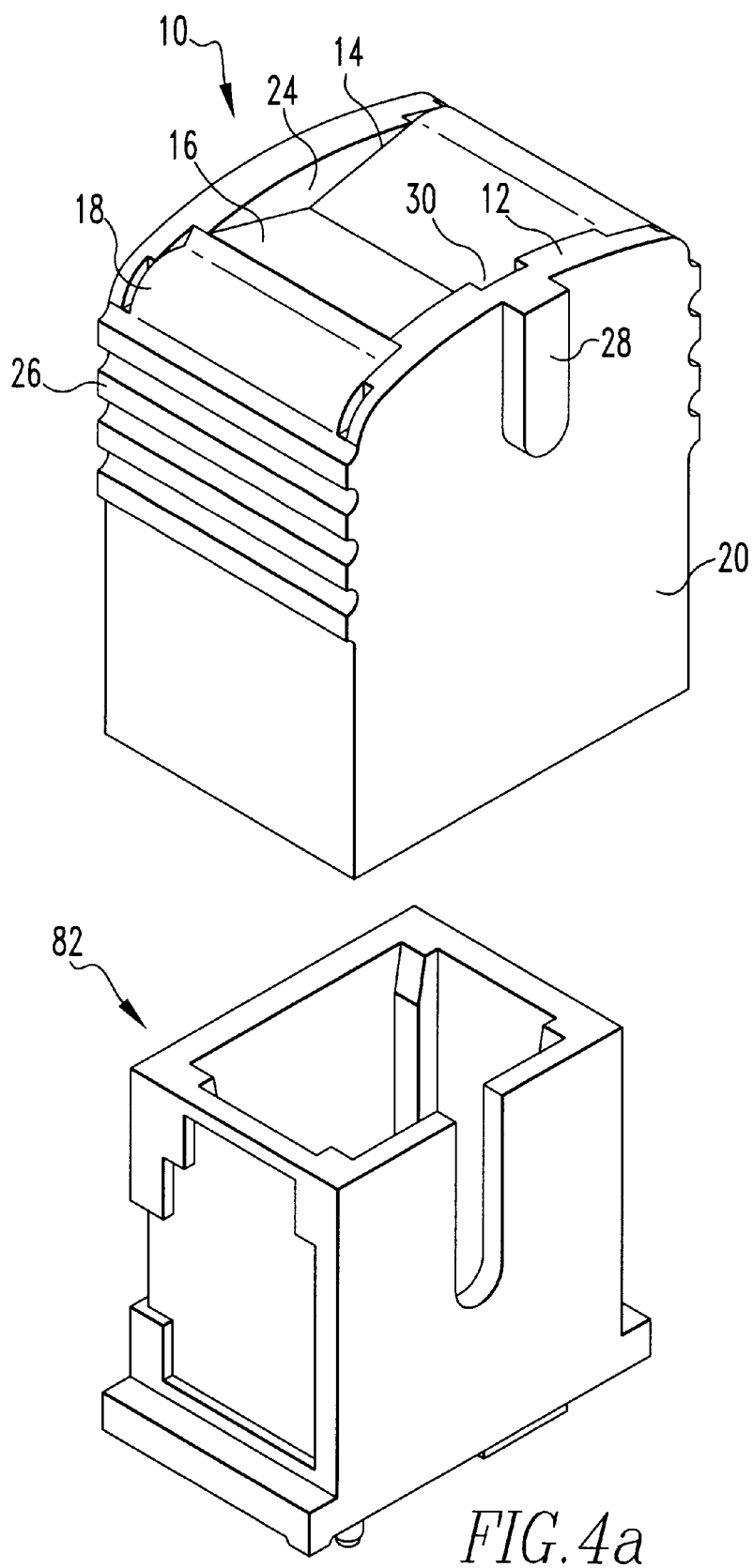
FIG. 4a is a perspective view of the shutter door assembly and an adapter prior to the shutter door assembly being fitted onto the adapter.

Housing 12 has internal features (not shown) that correspond to the external geometry of a specified adapter 82, as shown in FIG. 4a, when assembly 10 is fitted onto adapter 82. These features are skewed to allow assembly 10 to be inserted only one way on adapter 82. Note that although this invention is shown as used with a standard SC adapter, assembly 10 can easily be modified for use with a variety of other adapters.

Figure 4B:
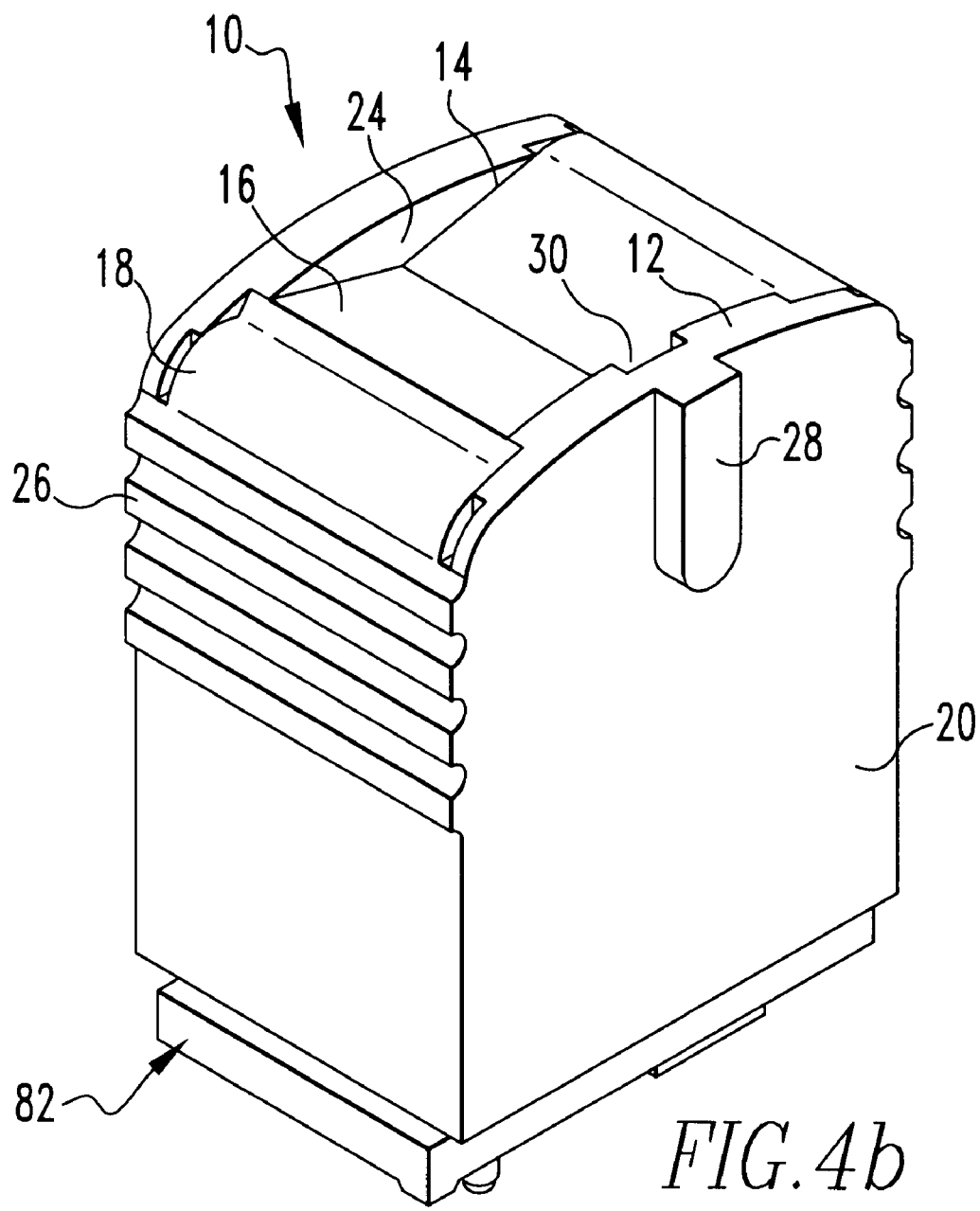
FIG. 4b is a perspective view of the shutter door assembly in place over the adapter.

As stated above, inwardly facing doors 14 give access to connector 80 when assembly 10 is positioned about an adapter 82 as shown in FIG. 4b. Doors 14 are an integral part of housing 12 and have elastomeric living hinge (or leaf spring) 18 that permits doors 14 to be pushed inwardly (FIG. 3) or outwardly to the closed position (FIG. 4) by the insertion or withdrawal of connector 80. The use of living hinge 18 reduces the number of parts that the shutter door assembly requires as compared to conventional adapter covers that use metallic springs or the like. The living hinge or leaf spring 18 returns shutter doors 14 to the closed position after connector 80 is removed preventing expulsion of laser light or influx of debris. Thus, the geometry of housing 12 and doors 14 allow for "one hand" installation and removal of connector 80.

As shown in the Figures, thumb grips 26 and tabs 28 are located on outer surface 20 of housing 12 of assembly 10. Thumb grips 26 are used to manually remove assembly 10 from an adapter 82. Tabs 28 are used to help align a connector 80 when being inserted through shutter doors 14 into an adapter 82 and indicate keyways 30 located on inner surface 22 of housing 12. These keyways 30 correspond to outer surface 88 of a connector such that when a connector 80 is being inserted through doors 14, the connector is prealigned with the associated adapter 82. The wrap-around design of the housing shields the keyways and prevents the intrusion of debris.

The one-piece design of the shutter door assembly eliminates excess tooling costs and reduces assembly costs. Further, the compact modular design allows the assembly to be used in space constrained applications, such as a standard SC six pack adapter plate.

Having described the presently preferred embodiments, it is to be understood that the invention may be otherwise embodied within the scope of the appended claims.

What is claimed is:

1. A shutter door housing assembly for a fiber optic connector adapter for receivably accepting a fiber optic connector providing an adapter and connector combination comprising:

(a) a housing with means to connectedly fit to said adapter to provide a substantially enclosed area for receiving said connector; and (b) a pair of shutter doors, each said door being pivotally connected to an opposing side of said housing for receivably accepting said connector such that said doors are configured to overlap each other thereby deterring substantially all light therewithin from communicating outside said housing.

2. The assembly of claim 1 wherein said doors remain entirely contained within said housing when said adapter is receiving said connector.

3. The assembly of claim 1 wherein said assembly is a single molded part.

4. The assembly of claim 1 wherein said connector pushes said doors inwardly to said housing as said adapter is receiving said connector such that said doors require no space outside said housing to permit entry of said connector into said adapter.

5. A shutter door assembly for a fiber optic connector adapter used to receive a fiber optic connector, said assembly comprising:

(a) a housing sized to connectedly fit over said adapter;

(b) a pair of shutter doors, each said shutter door being pivotally connected to an opposing side of said housing such that when said housing is mated with said adapter, said doors overlap each other and prevent light from escaping said housing and such that when a connector is received by said adapter, said doors fold into said housing.

6. The assembly of claim 5 wherein said assembly is a single molded part.

7. The assembly of claim 6 wherein said assembly is made by injection molding.

8. The assembly of claim 5 wherein said connector pushes said folded doors inwardly to said housing as said adapter is receiving said connector such that said doors require no space outside said housing to permit entry of said connector into said adapter.

9. The assembly of claim 5 wherein said doors remain entirely contained within said housing when said adapter is receiving said connector.

10. The assembly of claim 5 wherein said doors are made of molded plastic material.

11. The assembly of claim 5 wherein said doors are made out of a molded metal material.

12. The assembly of claim 5 wherein said doors automatically block light from exiting said adapter when said connector is unplugged.

13. The assembly of claim 5 wherein said doors when in a closed position overlap to create a hazardous path to prevent light from escaping.

14. The assembly of claim 5 wherein said housing has an outer surface having grips for aiding in removal of said assembly from said adapter.

15. The assembly of claim 5 wherein said housing has a keying means for aiding with alignment of said adapter and said connector.

16. The assembly of claim 5 wherein the face of said fiber carried by said connector is protected when placed into said adapter by said doors being angled inwardly such that said fiber face does not contact said doors.

17. The assembly of claim 5 wherein said doors are pivotally connected to said housing via a living hinge.

18. The assembly of claim 5 wherein said doors are pivotally connected to said housing via a leaf spring.

19. A shutter door assembly for a fiber optic connector adapter used to receive a fiber optic connector, said assembly comprising:

(a) a housing sized to connectedly fit over said adapter;

(b) a pair of shutter doors, said shutter doors integrally formed with said housing on opposing sides of said housing such that when said housing is mated with said adapter, said doors overlap each other to prevent light from escaping said housing.

20. A shutter door assembly for a fiber optic connector adapter used to receive a fiber optic connector, wherein said assembly is retrofittable to existing fiber optic adapters, said assembly comprising:

(a) a housing sized to connectedly fit over said adapter;

(b) a pair of shutter doors, said shutter doors integrally formed with said housing on opposing sides of said housing such that when said housing is mated with said adapter, said doors overlap each other to prevent light from escaping said housing.

* * * * *